(12) United States Patent
Minbuta et al.

(10) Patent No.: US 8,100,414 B2
(45) Date of Patent: Jan. 24, 2012

(54) CHUCK APPARATUS

(75) Inventors: Hideaki Minbuta, Yokohama (JP); Katsuhiko Kato, Hadano (JP)

(73) Assignee: SMC Kabushiki Kaisha, Tokyo (JP)

( * ) Notice: Subject to any disclaimer, the term of this patent is extended or adjusted under 35 U.S.C. 154(b) by 1045 days.

(21) Appl. No.: 12/014,759

(22) Filed: Jan. 15, 2008

(65) Prior Publication Data

US 2008/0169619 A1    Jul. 17, 2008

(30) Foreign Application Priority Data

Jan. 16, 2007 (JP) .................... 2007-006998

(51) Int. Cl.
*B23B 31/24*    (2006.01)
(52) U.S. Cl. ..... 279/126; 279/4.1; 279/4.12; 294/119.1; 294/907
(58) Field of Classification Search .............. 279/126, 279/125, 140, 4.11, 4.12, 4.1, 111; 294/119.1, 294/907, 88
See application file for complete search history.

(56) References Cited

U.S. PATENT DOCUMENTS

| | | | | |
|---|---|---|---|---|
| 4,509,783 | A | * | 4/1985 | Ionescu ................ 294/88 |
| 4,682,805 | A | | 7/1987 | Reynolds |
| 6,318,779 | B1 | * | 11/2001 | Hanne et al. ........... 294/88 |
| 6,339,990 | B1 | * | 1/2002 | Strietzel et al. ........ 101/408 |
| 6,428,070 | B1 | * | 8/2002 | Takanashi et al. ...... 294/88 |
| 2006/0175852 | A1 | * | 8/2006 | Sotome et al. ......... 294/88 |

FOREIGN PATENT DOCUMENTS

| | | |
|---|---|---|
| JP | 11-114869 | 4/1999 |
| JP | 2000-180109 | 6/2000 |

* cited by examiner

*Primary Examiner* — Daniel Howell
*Assistant Examiner* — Paul M Janeski
(74) *Attorney, Agent, or Firm* — Paul A. Guss

(57) ABSTRACT

A piston is displaced by a pressure fluid supplied to a chuck body, whereupon a pair of first and second fingers that constitute a gripping member are operated to open and close along a base body. Further, a shaft-shaped bobbin is inserted through the interior of the first and second fingers, and a coil is wound around a small diameter portion of the bobbin. Accompanying opening/closing operations of the first and second fingers, an opening/closing amount thereof is detected based on a change in impedance of the coil.

9 Claims, 11 Drawing Sheets

CHUCK APPARATUS

BACKGROUND OF THE INVENTION

1. Field of the Invention

The present invention relates to a chuck apparatus, which is capable of gripping a workpiece under an opening/closing action of a gripping member. More specifically, the invention concerns a chuck apparatus incorporating a detector therein that can detect an opening/closing amount of the gripping member.

2. Description of the Related Art

Heretofore, a chuck apparatus has been known, for example, which is mounted on the end of a shaft or the like of a machine tool. By performing opening/closing operations of a pair of gripping members, upon supplying a pressure fluid or an electric signal thereto, workpieces made up of various parts or the like are gripped by the chuck apparatus.

In this type of chuck apparatus, for example as disclosed in Japanese Laid-Open Patent Publication No. 11-114869, gripping of the workpiece is performed by controlling an opening/closing amount of the gripping members, corresponding to the size of the workpiece to be gripped. For this purpose, it is known to provide a detector, which is capable of detecting the opening/closing amount of the gripping members. In such a detector, the pair of gripping members is disposed on the upper surface of a displaceable guide rail, and the detector comprises a plurality of coils arranged along the guide rail. Further, in a similar manner, a plurality of other coils is disposed as well on the upper surface of an opposite side, sandwiching the guide rail therebetween. Additionally, by displacement of the gripping members between two coils, which are arranged in confronting positions sandwiching the guide rail, the amount of opening/closing of the gripping members is detected based on an induced output signal that is output.

However, in the aforementioned conventional technique, since the detector is constructed from plural coils, which are arranged along the displacement direction of the gripping members, an increase in the number of parts and a greater manufacturing cost for the chuck apparatus is incurred, and the apparatus becomes large in scale due to the coils, which are provided in plurality.

SUMMARY OF THE INVENTION

A general object of the present invention is to provide a chuck apparatus in which an increase in size and scale as a result of the detection device is suppressed, while the opening/closing amount of a gripping member can be detected with high accuracy by means of a simple and efficient structure.

The above and other objects features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
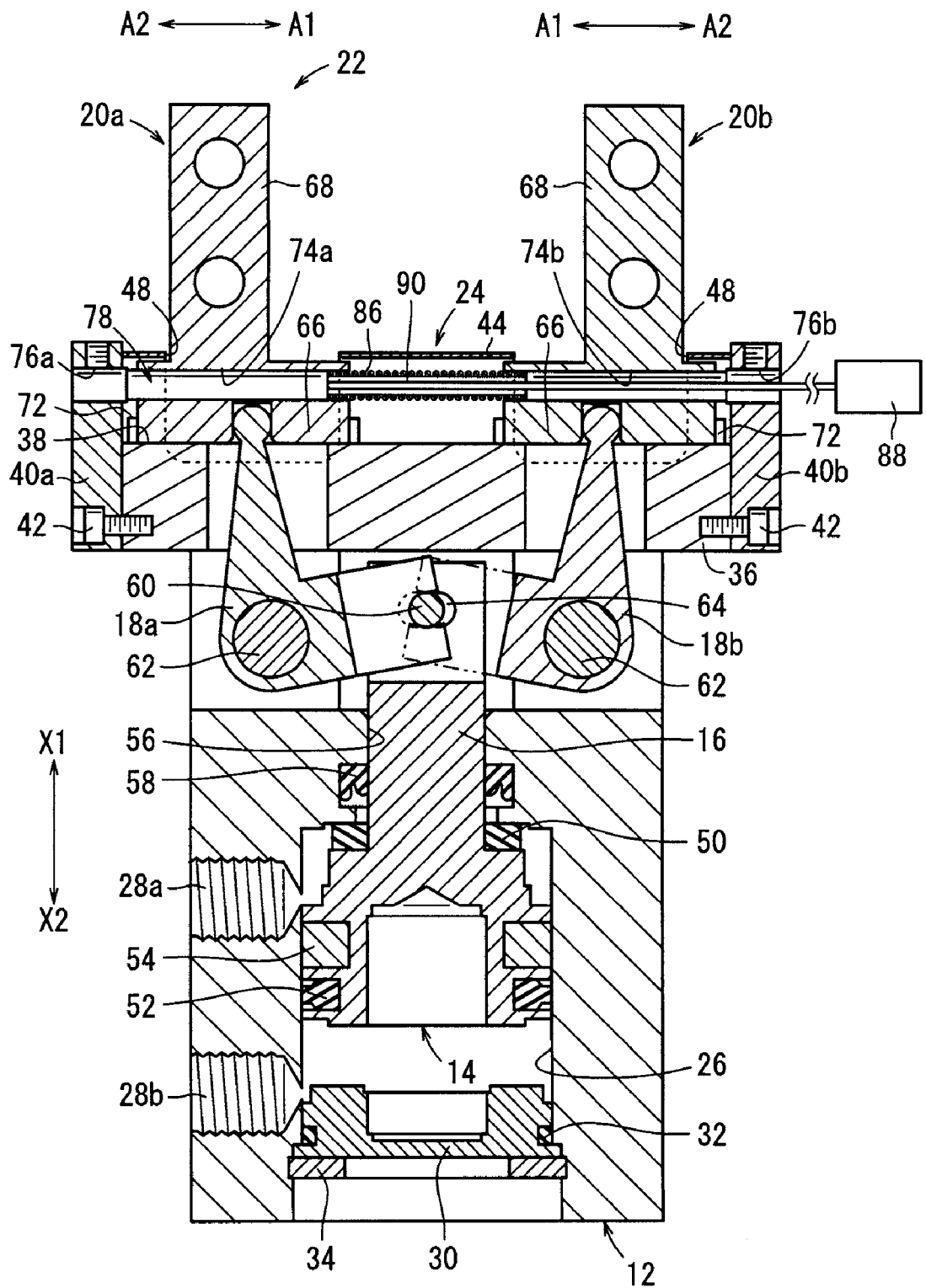
FIG. 1 is an overall vertical cross sectional view of a chuck apparatus according to a first embodiment of the present invention.

In FIG. 1, reference numeral 10 indicates a chuck apparatus according to a first embodiment of the present invention.

Figure 2:
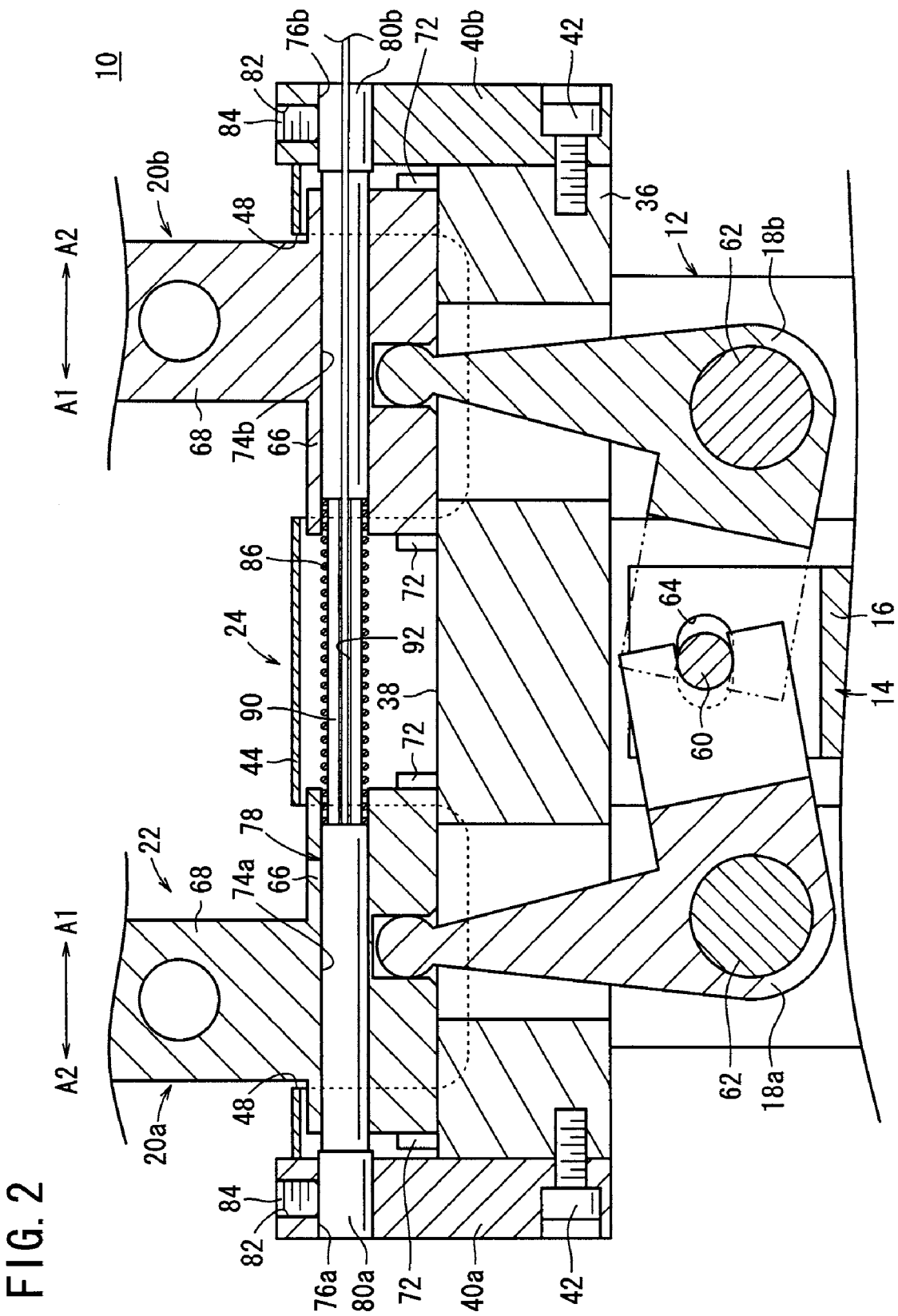
FIG. 2 is an enlarged vertical cross sectional view showing the vicinity of the gripping member of the chuck apparatus illustrated in FIG. 1.
Figure 3:
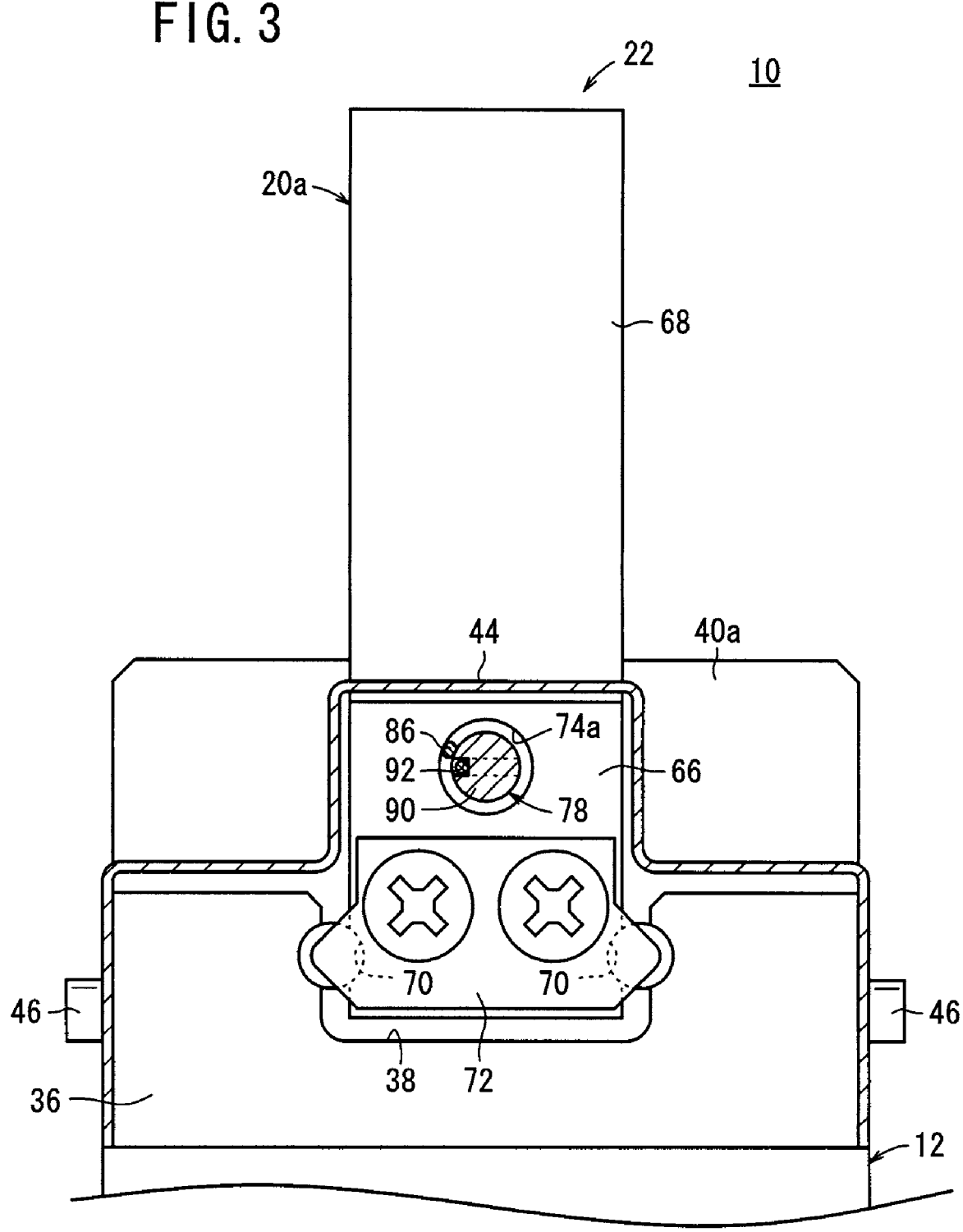
FIG. 3 is an enlarged side plan view showing the vicinity of the gripping member of the chuck apparatus illustrated in FIG. 1.

The chuck apparatus 10, as shown in FIGS. 1 to 3, includes a cylindrically shaped chuck body 12, a piston 14 displaceably disposed in the interior of the chuck body 12, a gripping member 22 having a pair of first and second fingers (chucks) 20a, 20b that are operated to open and close through levers 18a, 18b which are engaged with a rod 16 of the piston 14, and a detection mechanism (detector) 24 disposed on an end of the chuck body 12 for detecting an opening/closing amount of the gripping member 22.

The chuck body 12 is formed with a substantially rectangular shape in cross section, having a through hole 26 that penetrates in the axial direction formed in the interior thereof. First and second ports 28a, 28b, through which a pressure fluid is supplied to the interior of the through hole 26, open onto a side surface of the chuck body 12.

A cap 30 is fitted into the through hole 26 on one of the open end sides thereof, the through hole 26 being blocked by the cap 30. Further, an annular seal member 32 is installed on an outer circumferential surface of the cap 30, such that the inside of the through hole 26 is maintained in an airtight condition by abutment against the inner circumferential surface of the through hole 26. The cap 30 is retained with respect to the through hole 26 by an engagement ring 34, which is installed on an inner side surface of the through hole 26.

The first and second ports 28a, 28b are separated from each other by a predetermined interval in the axial direction (the direction of arrows X1 and X2) of the chuck body 12. The first port 28a communicates with one end surface (in the direction of the arrow X1) of the piston 14, whereas the second port 28b communicates between the other end surface of the piston 14 and the cap 30. Moreover, the first and second ports 28a, 28b are connected to an unillustrated pressure fluid supply source.

Further, a base body 36 in the form of a plate is connected to the other end of the chuck body 12. A rail groove 38, through which a pair of first and second fingers 20a, 20b constituting the gripping member 22 are guided, is formed in the base body 36. The rail groove 38 is formed along a straight line on a side surface of the base body 36, on a side opposite to that of the chuck body 12, and further, extends along the longitudinal direction thereof, substantially perpendicular to the axis of the chuck body 12. In addition, a pair of end blocks 40a, 40b are fixed to both ends of the base body 36 through bolts 42.

Furthermore, a cover 44 is installed on an upper portion of the base body 36 so as to cover portions of the base body 36 and the gripping member 22. The cover 44 is formed from a bent plate material, for example, covering the base body 36. An end of the cover 44 is fixed with respect to the base body 36 by bolts 46 (see FIG. 3).

The cover 44 includes a finger hole 48 through which the first and second fingers 20a, 20b of the gripping member 22 are inserted. The finger hole 48 has an opening size that corresponds with the displacement range of the first and second fingers 20a, 20b. Therefore, when undergoing opening/closing movements, the first and second fingers 20a, 20b do not come into contact with the cover 44.

A damper 50, made of an elastic material such as rubber or the like, is installed on one end surface of the piston 14, so shocks are absorbed when the piston 14 is displaced toward the gripping member 22 (in the direction of the arrow X1) and abuts against the inner wall surface of the through hole 26.

On the other hand, the outer circumferential surface of the piston 14 is disposed in sliding contact along the inner circumferential surface of the through hole 26, and a piston packing 52, which is installed in an annular groove on the outer circumferential surface, abuts against the inner circumferential surface of the through hole 26. Owing thereto, airtightness at the interior of the through hole 26, on respective sides of both end surfaces of the piston 14, is suitably maintained.

Further, a magnet 54 adjacent to the piston packing 52 is arranged on the outer circumferential surface of the piston 14. The displacement position of the piston 14 is confirmed by an unillustrated position-detecting sensor, which senses the magnetism from the magnet 54.

A rod 16, which is radially reduced in diameter and extends toward the side of the gripping member 22 (in the direction of the arrow X1), is formed on one end surface side of the piston 14, whereas the other end surface of the piston 14 is arranged to confront the cap 30. The rod 16 is inserted through a rod hole 56, which is reduced in diameter with respect to the through hole 26, and a rod packing 58 disposed on the inner circumferential surface of the rod hole 56 abuts against the outer circumferential surface of the rod 16.

A pair of levers 18a, 18b are engaged rotatably with the rod 16 through a pin 60. The levers 18a, 18b are each L-shaped in cross section, wherein substantially central bent portions thereof are rotatably axially supported, respectively, through a pair of link pins 62 disposed in the chuck body 12.

Further, ends of each of the levers 18a, 18b are formed with cutouts 64 therein, cut respectively in a semicircular shape, which engage with the pin 60 installed in the end portion of the rod 16. On the other hand, the levers 18a, 18b are formed in a gradually narrowed shape, which narrows toward the other end sides thereof from the regions supported by the link pins 62, and are axially supported respectively within interior portions of the first and second fingers 20a, 20b that constitute the gripping member 22.

More specifically, the pair of levers 18a, 18b are displaceable rotatably through the link pins 62 upon displacement of the rod 16 along the axial direction (in the directions of arrows X1 and X2), such that the other end side portions thereof approach and separate away from each other.

As shown in FIG. 2, the gripping member 22 includes the pair of first and second fingers 20a, 20b, which are disposed displaceably along the rail groove 38 of the base body 36. The first and second fingers 20a, 20b include block-shaped main bodies 66, which are guided within the rail groove 38, and claw portions 68 that project from the main bodies 66 and grip the workpiece.

Grooves 70 (see FIG. 3) are formed respectively along the axial direction on both side portions on the main bodies 66. A plurality of balls (not shown) is installed linearly within the grooves 70. Additionally, the balls are retained in the grooves 70 by cover plates 72 that are installed on both end surfaces of the base body 36. The balls are retained in abutment against inner wall surfaces of the rail groove 38 confronting the grooves 70. Owing thereto, displacement resistance is reduced when the first and second fingers 20a, 20b that constitute the gripping member 22 are displaced along the rail groove 38, and the first and second fingers 20a, 20b can be displaced smoothly along the rail groove 38.

Further, first bobbin holes 74a, 74b, which extend substantially perpendicularly with respect to the claw portions 68, and penetrate substantially parallel to the displacement direction of the first and second fingers 20a, 20b, are formed respectively inside the main bodies 66. In addition, the respective first bobbin holes 74a, 74b are disposed along a straight line, under a condition in which the first and second fingers 20a, 20b are installed in the rail groove 38 (see FIG. 1).

Furthermore, second bobbin holes 76a, 76b are formed in the end blocks 40a, 40b in positions facing the first bobbin holes 74a, 74b, such that large diameter portions 80a, 80b of a bobbin 78 are inserted into the second bobbin holes 76a, 76b. In addition, because the first bobbin holes 74a, 74b and the second bobbin holes 76a, 76b are disposed on the same axis, both ends of the bobbin 78 are retained by the second bobbin holes 76a, 76b.

Screw holes 82, which open upwardly and communicate with the second bobbin holes 76a, 76b, are formed in the end blocks 40a, 40b, with fixing bolts 84 being threaded into the screw holes 82. Since the screw holes 82 penetrate perpendicularly with respect to the second bobbin holes 76a, 76b, the fixing bolts 84, by screw-rotation thereof, are displaceable in directions (the directions of arrows X1 and X2) to approach and separate away from the second bobbin holes 76a, 76b.

More specifically, by displacing the fixing bolts 84 toward the bobbin 78 (in the direction of the arrow X2 in FIG. 1), because the outer circumferential surface of the bobbin 78, which is inserted through the second bobbin holes 76a, 76b, is pressed by the ends of the fixing bolts 84, the bobbin 78 is fixed firmly inside the second bobbin holes 76a, 76b.

Accordingly, the bobbin 78 is prevented from being displaced in the axial direction (the direction of arrows A1, A2), and is retained in a state whereby the bobbin 78 is inserted through the first bobbin holes 74a, 74b of the gripping member 22.

Stated otherwise, the fixing bolts 84 disposed in the end blocks 40a, 40b function as stoppers, which regulate axial displacement of the bobbin 78.

Figure 4:
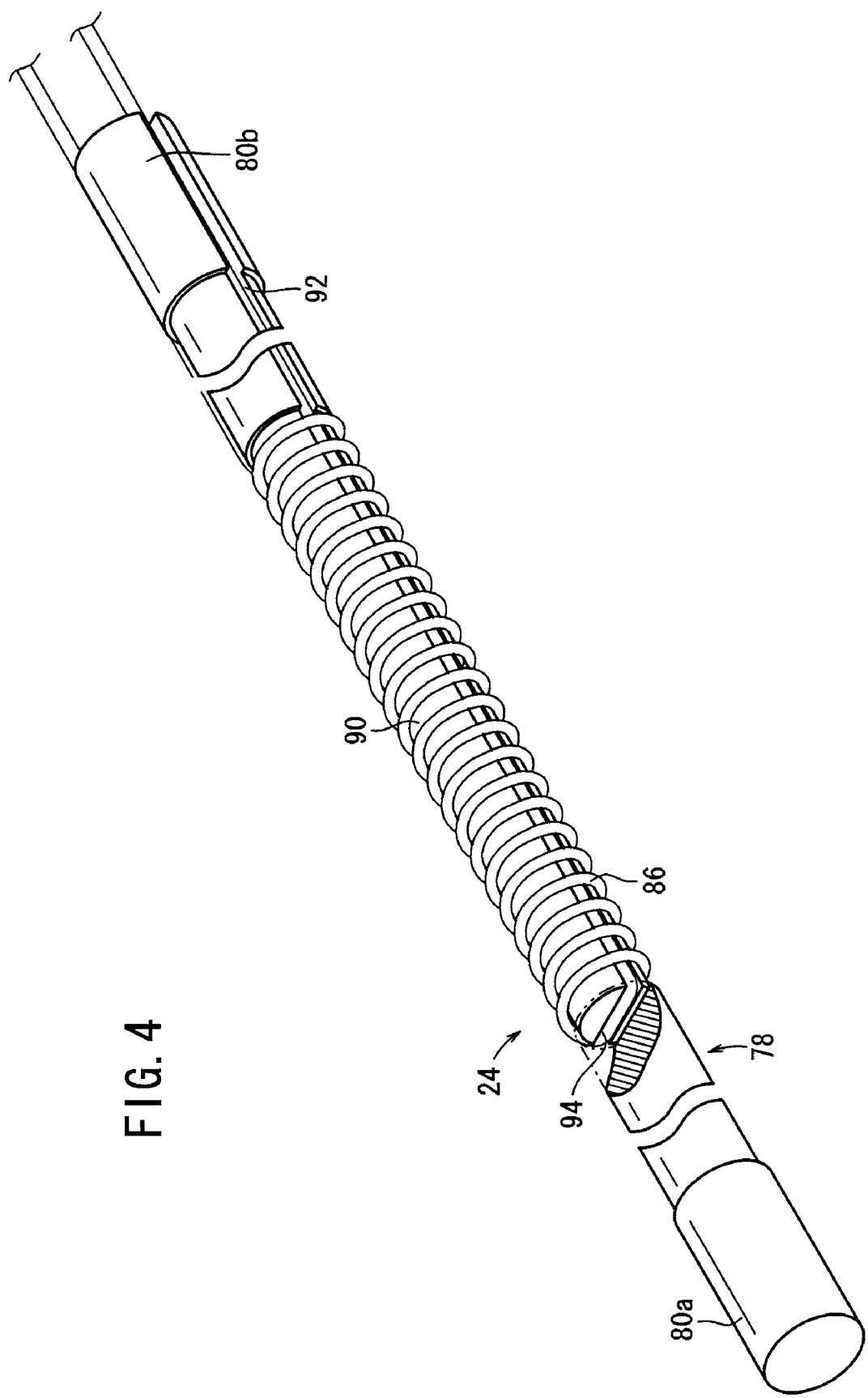
FIG. 4 is an exterior perspective view of a coil and bobbin constituting a detection mechanism.

The detection mechanism 24, as shown in FIGS. 2 and 4, is made up from the bobbin 78, which is inserted through the interior of the first and second fingers 20a, 20b, a coil 86 that is wound around the outer circumferential surface of the bobbin 78, and a substrate 88 (see FIG. 1), which is connected to the coil 86.

The bobbin 78 is formed from an elongate shaft, having large diameter portions 80a, 80b that are inserted through the first and second bobbin holes 76a, 76b of the first and second fingers 20a, 20b, and a small diameter portion 90 disposed substantially centrally along the axial direction thereof, which is reduced in diameter with respect to the large diameter portions 80a, 80b, with the coil 86 being wound around the small diameter portion 90. Specifically, on the bobbin 78, the small diameter portion 90 is disposed such that it is sandwiched between the large diameter portions 80a, 80b, which are disposed on both respective ends of the bobbin 78.

The diameter of the large diameter portions 80a, 80b is set roughly equivalent to the inner circumferential diameters of the first and second bobbin holes 74a, 74b, 76a, 76b, so that the bobbin 78 can be supported by insertion thereof through the second bobbin holes 76a, 76a and by the fixing bolts 84.

Further, in the open state (see FIG. 2) in which the first finger 20a and the second finger 20b are maximally separated, the small diameter portion 90 is arranged between the first finger 20a and the second finger 20b, such that the small diameter portion 90 is exposed to the outside with respect to the first bobbin holes 74a, 74b. Both ends of the small diameter portion 90 are arranged such that the ends are inserted slightly into the respective first bobbin holes 74a, 74b when the gripping member 22 is opened. More specifically, a state is provided in which both ends of the coil 86, which is wound around the small diameter portion 90, also are inserted slightly inside the first bobbin holes 74a, 74b.

The coil 86 is wound in a spiral shape with respect to the small diameter portion 90, such that the outer circumferential diameter thereof is set to be roughly the same or just slightly smaller than that of the large diameter portions 80a, 80b.

Furthermore, a coil groove (groove) 92 is formed linearly along the axial direction on the outer circumferential surface of the large diameter portion 80b and small diameter portion 90, which are inserted through the second finger 20b, wherein the coil 86 is installed along the coil groove 92. Further, on the end of the small diameter portion 90 on the side of the large diameter portion 80a, a coil hole (hole) 94 is formed (see FIG. 4), such that the coil hole 94 connects with the coil groove 92.

In greater detail, after the coil 86 has been inserted through and along the coil groove 92 of the large diameter portion 80b and the small diameter portion 90, on the side of the second finger 20b, the coil 86 is wound with respect to the outer circumferential surface of the small diameter portion 90, so that the coil 86, which was inserted through the coil hole 94, returns toward the side of the second finger 20b from the side of the large diameter portion 80a, which is inserted through the first finger 20a.

Accordingly, the coil groove 92 is disposed so that the coil 86 can be fed therein until reaching the side of the large diameter portion 80a, where winding of the end portion of the coil 86 commences, and the coil 86 which has been inserted through the coil groove 92 is covered by the wound coil 86, which is wound over the small diameter portion 90. As a result, the coil 86 does not drop out externally from the coil groove 92 and is retained within the coil groove 92, and also, the position where winding commences is regulated by insertion through the coil hole 94.

Both ends of the coil 86 are connected respectively to the substrate 88. In the substrate 88, a change in impedance produced by the coil 86 is detected, and the opening/closing amount of the gripping member 22 is calculated based on the change in impedance.

The chuck apparatus 10 in accordance with the first embodiment of the present invention is constructed basically as described above. Next, operations and effects of the invention shall be explained. As shown in FIG. 1, a non-gripped state of the workpiece, in which the piston 14 is elevated toward the side of the gripping member 22 (in the direction of the arrow X1) and the pair of first and second fingers 20a, 20b is opened, is assumed as the initial condition.

First, a pressure fluid is supplied with respect to the first port 28a from an unillustrated pressure fluid supply source, whereby the piston 14 is displaced in a direction to separate from the gripping member 22 (in the direction of the arrow X2), and the ends of the pair of levers 18a, 18b engaged with the rod 16 of the piston 14 are pulled downward respectively. In this case, the second port 28b is placed in a state of being open to atmosphere.

Owing thereto, the pair of levers 18a, 18b are rotated respectively in directions so that the other ends approach mutually toward each other about fulcrums defined by the link pins 62, and the pair of first and second fingers 20a, 20b, which are engaged with the other ends, are displaced substantially horizontally in directions (the directions of arrows A1) to approach one another, mutually along the rail groove 38 of the base body 36. As a result, the workpiece is interposed between and gripped at a predetermined pressure by the first and second fingers 20a, 20b that constitute the gripping member 22.

In this case, by displacement of the first and second fingers 20a, 20b mutually in directions to approach each other (in the directions of the arrows A1), the coil 86 is inserted mutually from both ends sides thereof into the first bobbin holes 74a, 74b and the outer circumferential side of the coil 86 is covered. In addition, along with a change of the relative positions of the gripping member 22 and the coil 86, the impedance of the coil 86 changes, and by detecting a voltage change of the coil 86 based on the change in impedance, the displacement amount of the first and second fingers 20a, 20b is calculated in the substrate 88.

Further, at this time, the displacement amounts of the first and second fingers 20a, 20b are substantially the same, respectively, with respect to the coil 86.

On the other hand, when the gripped state of the workpiece by the chuck is released, the pressure fluid that was supplied to the first port 28a is supplied with respect to the second port 28b, by means of a switching operation of an unillustrated switchover valve. In this case, the first port 28a is placed in a state of being open to atmosphere.

Accordingly, the piston 14 is displaced toward the side of the gripping member 22 (in the direction of the arrow X1) under a pressing action of the pressure fluid directed to the through hole 26 from the second port 28b, and along therewith, the pair of levers 18a, 18b, which are engaged with the rod 16, are rotated respectively in directions so that the other ends separate mutually from each other about the fulcrums defined by the link pin 62. Owing thereto, the pair of first and second fingers 20a, 20b, which are engaged with the levers 18a, 18b, are displaced substantially horizontally in directions (the directions of arrows A2) to separate from one another, mutually along the rail groove 38 of the base body 36, and the first and second fingers 20a, 20b that grip the workpiece are displaced in directions to separate mutually from each other. As a result, the gripped state of the workpiece is released by the first and second fingers 20a, 20b.

In this case as well, by displacement of the first and second fingers 20a, 20b mutually in directions to separate from each other (in the directions of the arrows A2), portions of the coil 86 accommodated in the first bobbin holes 74a, 74b are displaced respectively toward the outside, and the outer circumferential side of the coil 86 is gradually exposed outside of the first and second fingers 20a, 20b. In addition, along with a change of the relative positions of the gripping member 22 and the coil 86, the impedance of the coil 86 changes, and by detecting a voltage change of the coil 86 based on the change in impedance, the displacement amount of the first and second fingers 20a, 20b is calculated.

In the foregoing manner, in the first embodiment, a detection mechanism 24 capable of detecting an opening/closing amount of the gripping member 22 is made up of the bobbin 78 that is inserted through the interior of the first and second fingers 20a, 20b, and a single coil 86 wound about a central portion of the bobbin 78, such that the coil 86 is wound in a spiral with respect to the small diameter portion 90 of the bobbin 78. In addition, by displacement of the first and second fingers 20a, 20b along the outer circumferential side of the coil 86 through the first bobbin holes 74a, based on the change in impedance of the coil 86, the displacement amount of the first and second fingers 20a, 20b can be continuously detected. As a result, because the opening/closing amount of the gripping member 22 can be detected directly by the detection mechanism 24, detection with minimal detection errors and high accuracy can be carried out. Workpieces can be gripped reliably by the gripping member 22, and the detection mechanism 24 can be formed of a simple structure from the coil 86 and the bobbin 78.

Further, because the coil 86 and bobbin 78 making up the detection mechanism 24 are structured such that they are capable of being accommodated respectively inside the gripping member 22, an increase in scale of the chuck apparatus 10 including the detection mechanism 24 disposed therein can be suppressed. That is, the detection mechanism 24 can be provided without causing the chuck apparatus 10 to become large in size.

Furthermore, because the detection mechanism 24 is capable of highly accurately detecting the opening/closing amount of the gripping member 22 that grips the workpiece, the opening/closing amount of the gripping member 22 can be controlled with high accuracy corresponding to the size of the workpiece. For example, compared to a case in which a displacement amount of the piston 14 is detected, which causes opening and closing movements of the gripping member 22, and the opening/closing amount of the gripping member 22 is detected based on the piston displacement amount, in the present invention, since the opening/closing amount of the gripping member 22 is detected directly, errors in the opening/closing amount are small, and detection can be performed with greater accuracy.

Still further, because the coil 86 is inserted through the coil groove 92 of the bobbin 78 and both ends of the coil 86 can be consolidated, the substrate 88 to which both ends are connected can be disposed on one side only of the coil 86, and the substrate 88 can be consolidated therewith, thus furthering a reduction in scale of the chuck apparatus 10.

Figure 5:
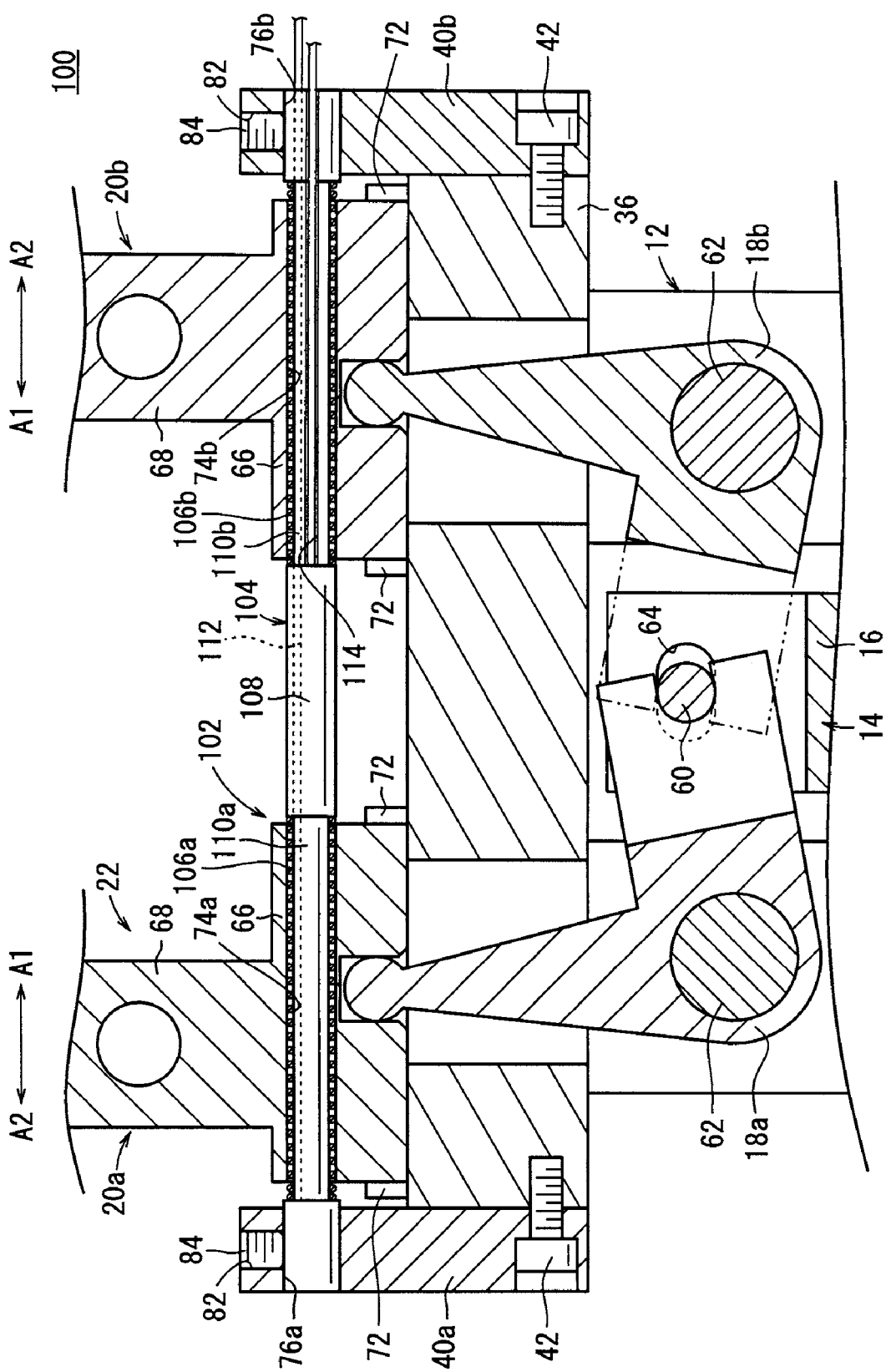
FIG. 5 is an enlarged cross sectional view showing the vicinity of the gripping member of a chuck apparatus in accordance with a second embodiment.

Next, a chuck apparatus 100 according to a second embodiment is shown in FIG. 5. In the respective chuck apparatuses 100, 120, 140, 150 according to the second through fifth embodiments indicated below, structural elements thereof which are the same as those of the chuck apparatus 10 according to the first embodiment, shall be designated with the same reference numerals, and detailed explanations of such features shall be omitted.

The chuck apparatus 100 according to the second embodiment differs from the chuck apparatus 10 according to the first embodiment in that, a pair of coils 106a, 106b are arranged on both end sides of the bobbin 104 that constitutes the detection mechanism (detector) 102, and that in a state in which the gripping member 22 is opened, the coils 106a, 106b are arranged so as to be capable of accommodation, respectively, within the interiors of the first bobbin holes 74a, 74b.

With the chuck apparatus 100, a large diameter portion 108 is formed at a substantially central portion of the bobbin 104 that makes up the detection mechanism 102, and a pair of small diameter portions 110a, 110b, around which coils 106a, 106b are wound, are formed on both ends about the central large diameter portion 108. The length of the small diameter portions 110a, 110b is formed to be slightly greater than the length of the first bobbin holes 74a, 74b. In addition, in a open state in which the first and second fingers 20a, 20b constituting the gripping member 22 are separated mutually from each other, parts of the small diameter portions 110a, 110b are exposed to the outside. That is, parts of the coils 106a, 106b that are wound around the small diameter portions 110a, 110b become exposed to the exterior.

Further, a first coil groove (groove) 112 is formed along the axial direction on an outer circumferential surface of the small diameter portion 110a that is inserted through the first finger 20a, with the coil 106a, which is wound around the small diameter portion 110a being inserted through the first coil groove 112. The first coil groove 112 extends from the one small diameter portion 110a and via the large diameter portion 108 until reaching the outer circumferential surface of the small diameter portion 110b, which is inserted through the second finger 20b.

Further, in addition to the coil groove 112 through which the coil 106a is inserted, a second coil groove (groove) 114 through which the coil 106b is inserted is provided on the small diameter portion 110b, which is inserted through the second finger 20b. In addition, the coils 106a, 106b inserted through the first and second coil grooves 112, 114 are led to the exterior respectively through the end block 40b.

In this manner, with the second embodiment, a pair of coils 106a, 106b is disposed respectively corresponding to the first and second fingers 20a, 20b, and by displacement of the first and second fingers 20a, 20b, the displacement amounts of the first and second fingers 20a, 20b can be detected continuously based on a change in impedance of the coils 106a, 106b that are accommodated within the first bobbin holes 74a, 74b.

Figure 6:
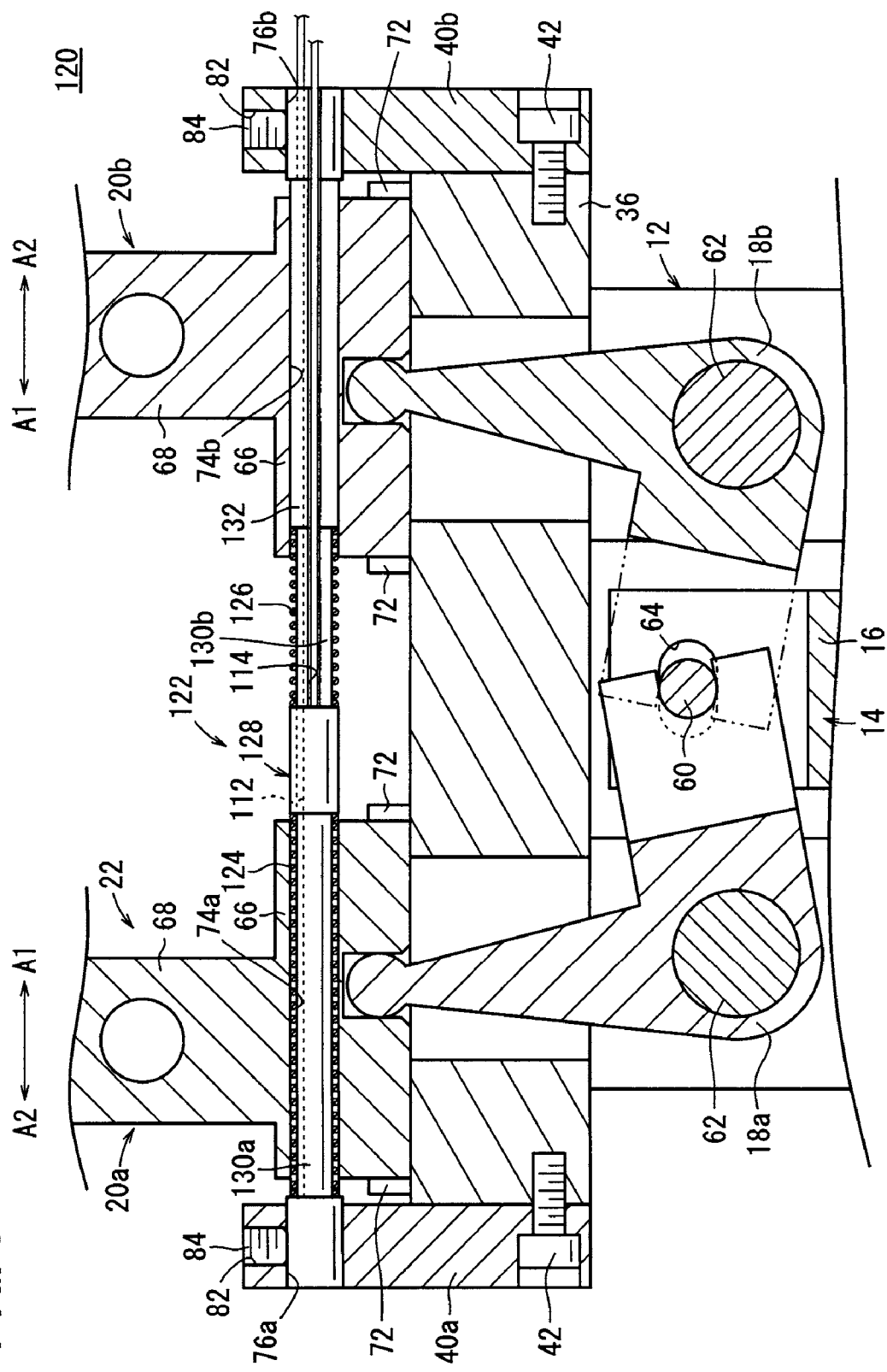
FIG. 6 is an enlarged cross sectional view showing the vicinity of the gripping member of a chuck apparatus in accordance with a third embodiment.

Next, a chuck apparatus 120 according to a third embodiment is shown in FIG. 6.

The chuck apparatus 120 according to the third embodiment differs from the chuck apparatuses 10, 100 according to the first and second embodiments in that, in an open state in which the first and second fingers 20a, 20b are separated mutually from each other, the first coil 124 making up the detection mechanism (detector) 122 is arranged in the first bobbin hole 74a of the first finger 20a, while a separate second coil 126 is arranged at a substantially central portion of the bobbin 128 between the first and second fingers 20a, 20b.

With the chuck apparatus 120, small diameter portions 130a, 130b are formed respectively on one end, and substantially in the center, of the bobbin 128 that constitutes the detection mechanism 122, and a large diameter portion 132 is formed on the other end of the bobbin 128, which is accommodated inside the second finger 20b. In addition, first and second coils 124, 126 are wound respectively around the small diameter portions 130a, 130b, such that the first coil 124 is accommodated within the first bobbin hole 74a of the first finger 20a.

Further, the other second coil 126 is arranged between the first finger 20a and the second finger 20b and exposed externally. Also, while the gripping member 22 is in a closed state, the second coil 126 is accommodated in the first bobbin hole 74b of the second finger 20b.

In this manner, in the third embodiment, when the first and second fingers 20a, 20b undergo opening and closing movements, the first coil 124 is gradually exposed outwardly, while conversely, the other second coil 126 is gradually covered, and vice versa.

More specifically, because the changes in impedance by the two first and second coils 124, 126 have opposite characteristics respectively, a large deviation therebetween can be obtained, and the detection accuracy of the displacement amounts of the first and second fingers 20a, 20b can be further improved, when the displacement amounts are detected by the changes in impedance.

Figure 7:
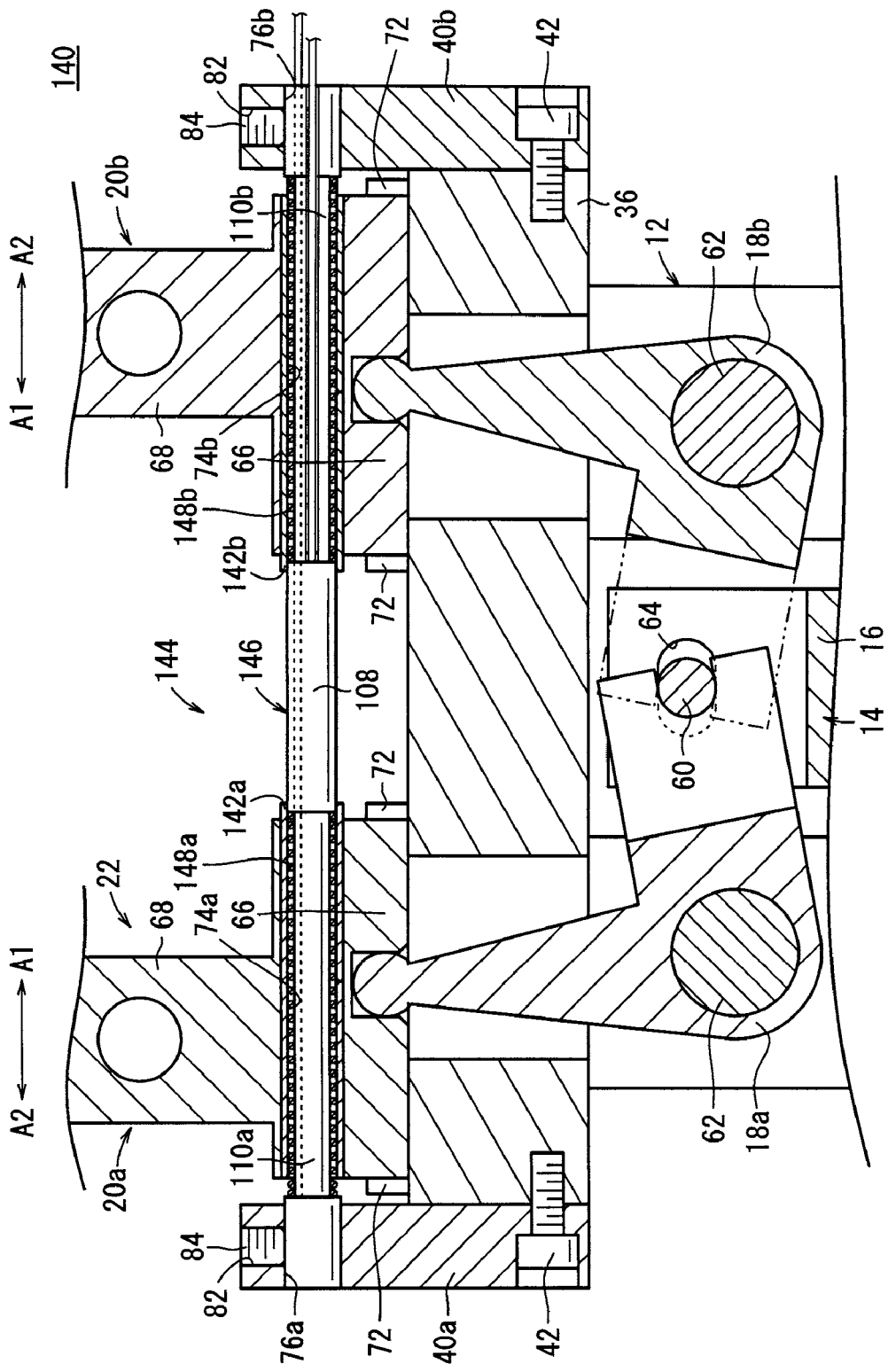
FIG. 7 is an enlarged cross sectional view showing the vicinity of the gripping member of a chuck apparatus in accordance with a fourth embodiment.
Figure 8:
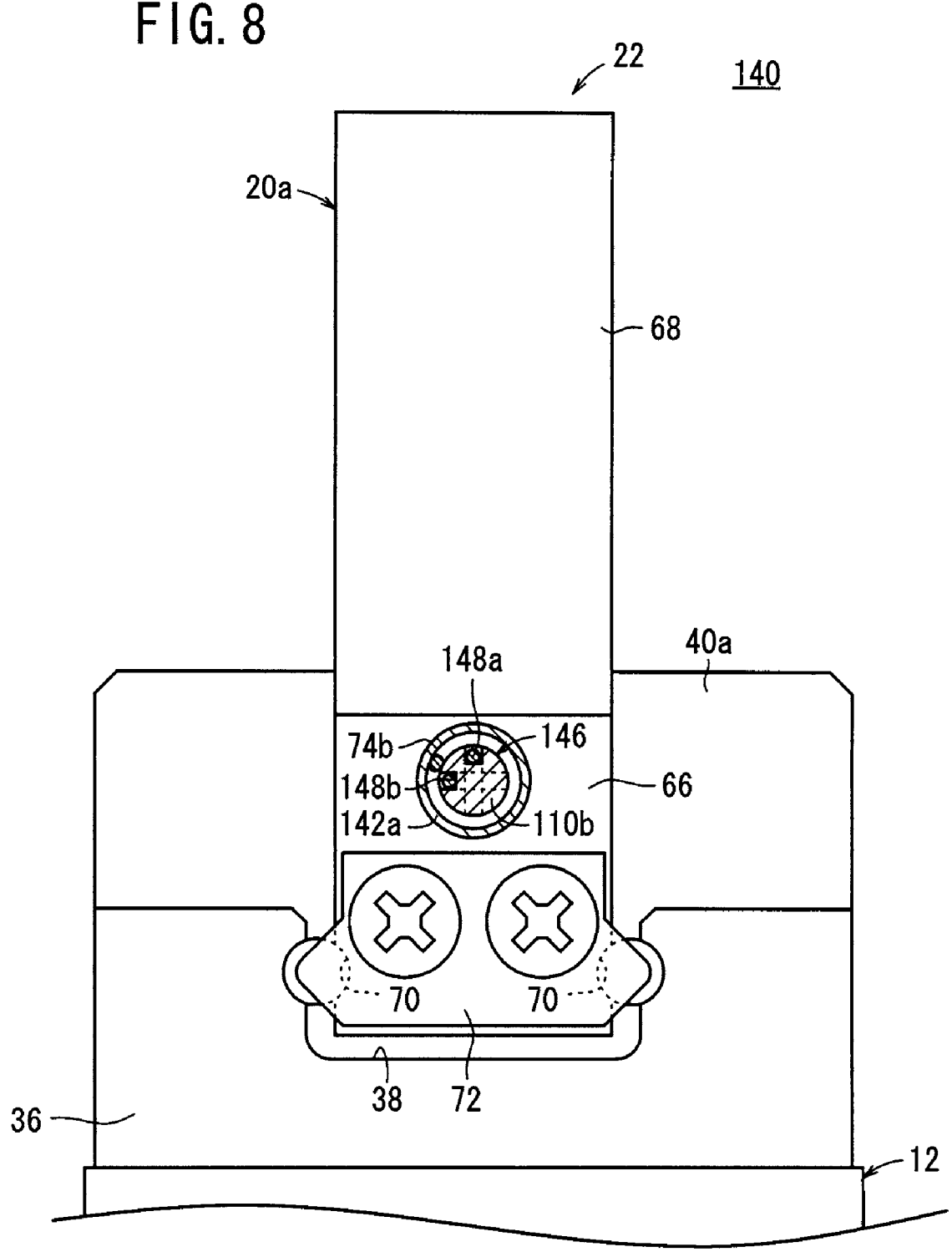
FIG. 8 is an enlarged side plan view showing the vicinity of the gripping member of the chuck apparatus shown in FIG. 7.

Next, a chuck apparatus 140 according to a fourth embodiment is shown in FIGS. 7 and 8.

The chuck apparatus 140 according to the fourth embodiment differs from the chuck apparatuses 10, 100, 120 according to the first through third embodiments in that tubular bodies 142a, 142b are inserted respectively into the first bobbin holes 74a, 74b of the first and second fingers 20a, 20b, while a bobbin 146 making up the detection mechanism (detector) 144 is inserted through the tubular bodies 142a, 142b, and together therewith, paired coils 148a, 148b are disposed respectively on both ends of the bobbin 146.

In the chuck apparatus 140, the tubular bodies 142a, 142b, which are made of a metal material such as aluminum, brass or the like, are arranged in the interior of the first and second fingers 20a, 20b. Further, the bobbin 146 is inserted through the inside of the tubular bodies 142a, 142b, and the pair of coils 148a, 148b are wound respectively with respect to small diameter portions 110a, 110b of the bobbin 146. More specifically, in an open state of the gripping member 22, the paired coils 148a, 148b are accommodated respectively in the first bobbin holes 74a, 74b of the first and second fingers 20a, 20b.

In this manner, with the fourth embodiment, by providing tubular bodies 142a, 142b respectively on the outer circumferential sides of the coils 148a, 148b, the output characteristics produced by the coils 148a, 148b can be caused to change in accordance with the material properties of the tubular bodies 142a, 142b. Specifically, desired output characteristics are capable of being obtained, by arbitrarily selecting the material properties of the tubular bodies 142a, 142b.

Figure 9:
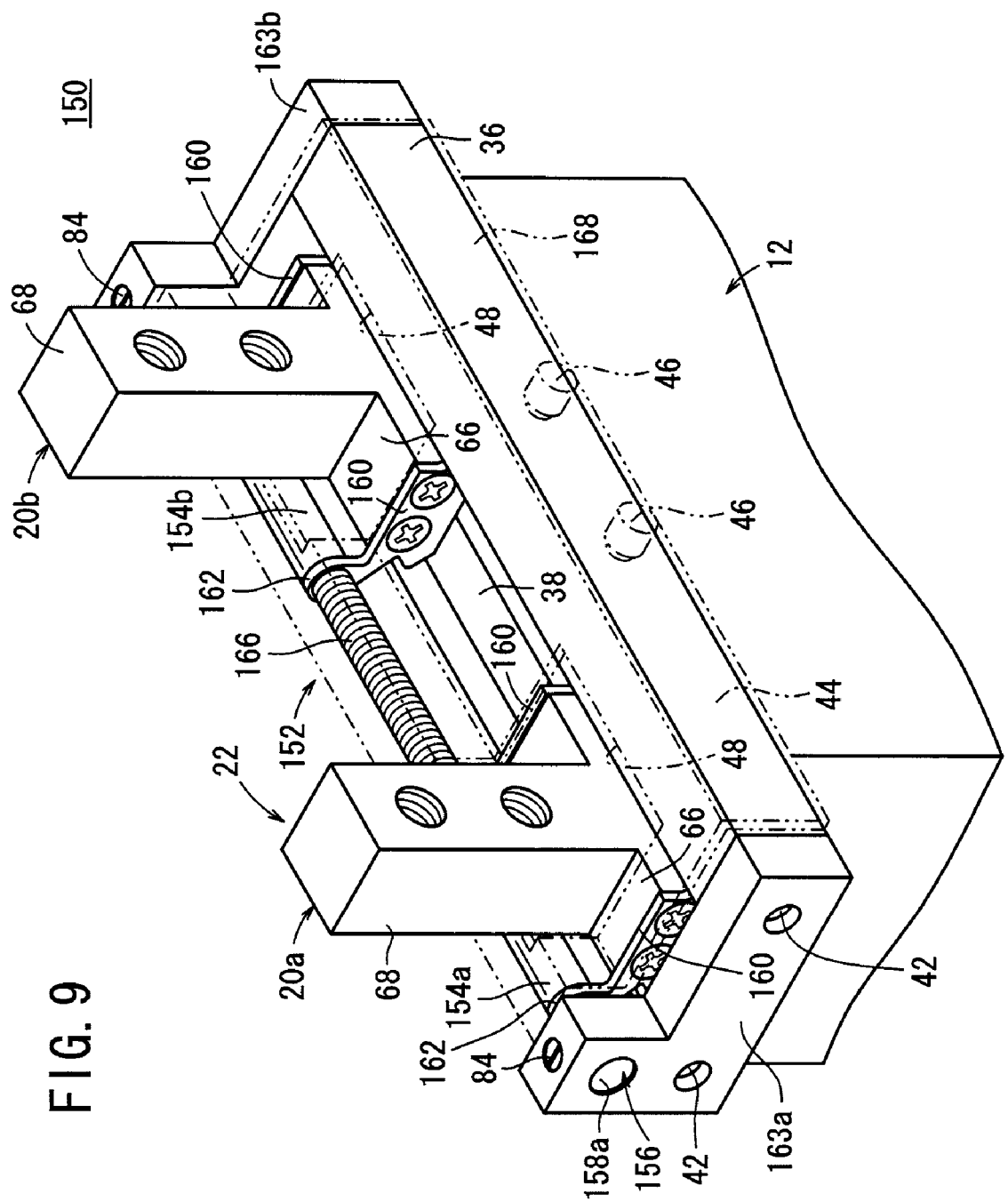
FIG. 9 is an enlarged perspective view showing the vicinity of the gripping member of a chuck apparatus in accordance with a fifth embodiment.
Figure 10:
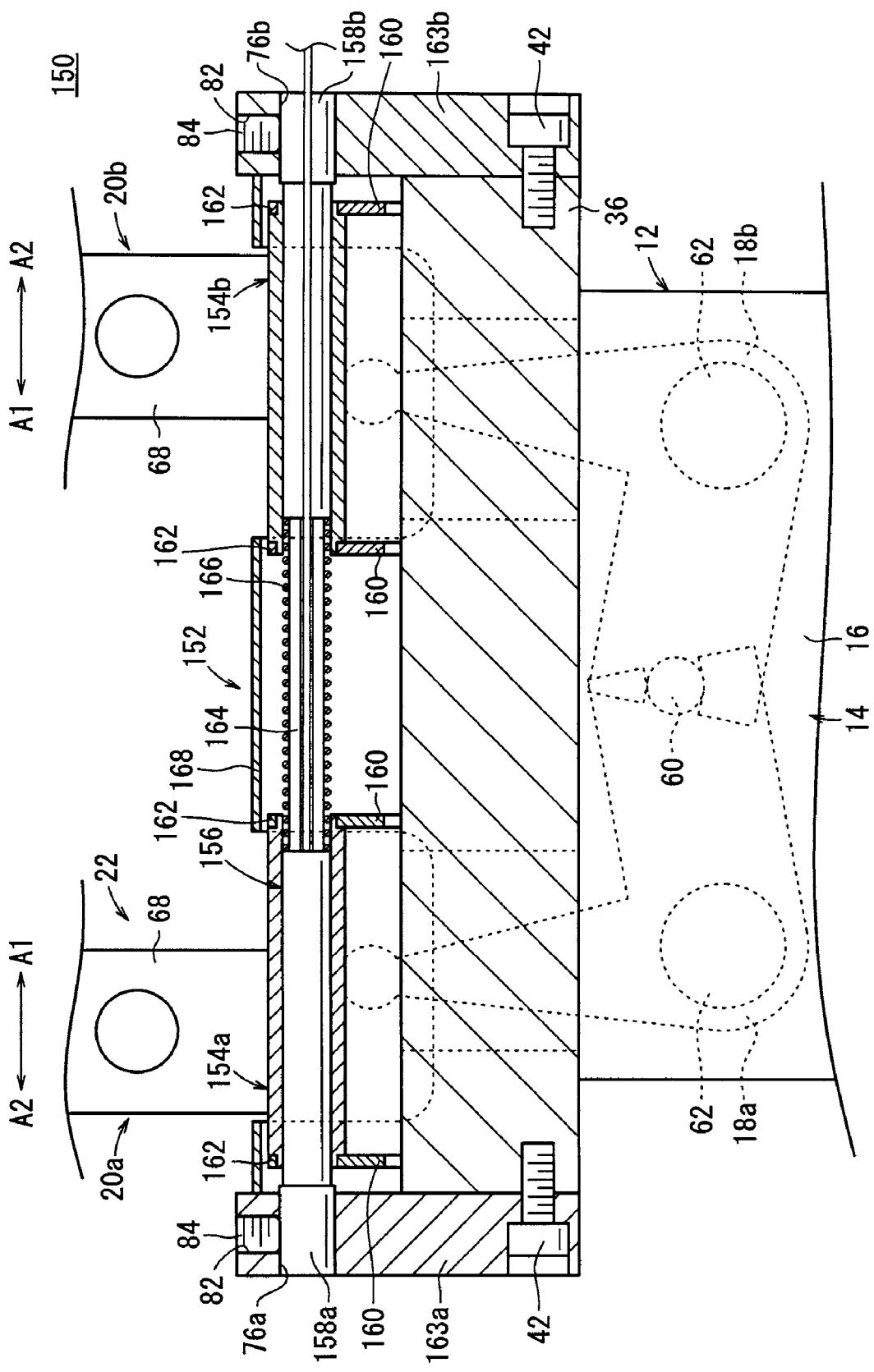
FIG. 10 is an enlarged vertical cross sectional view showing the vicinity of the gripping member in the chuck apparatus of FIG. 9.
Figure 11:
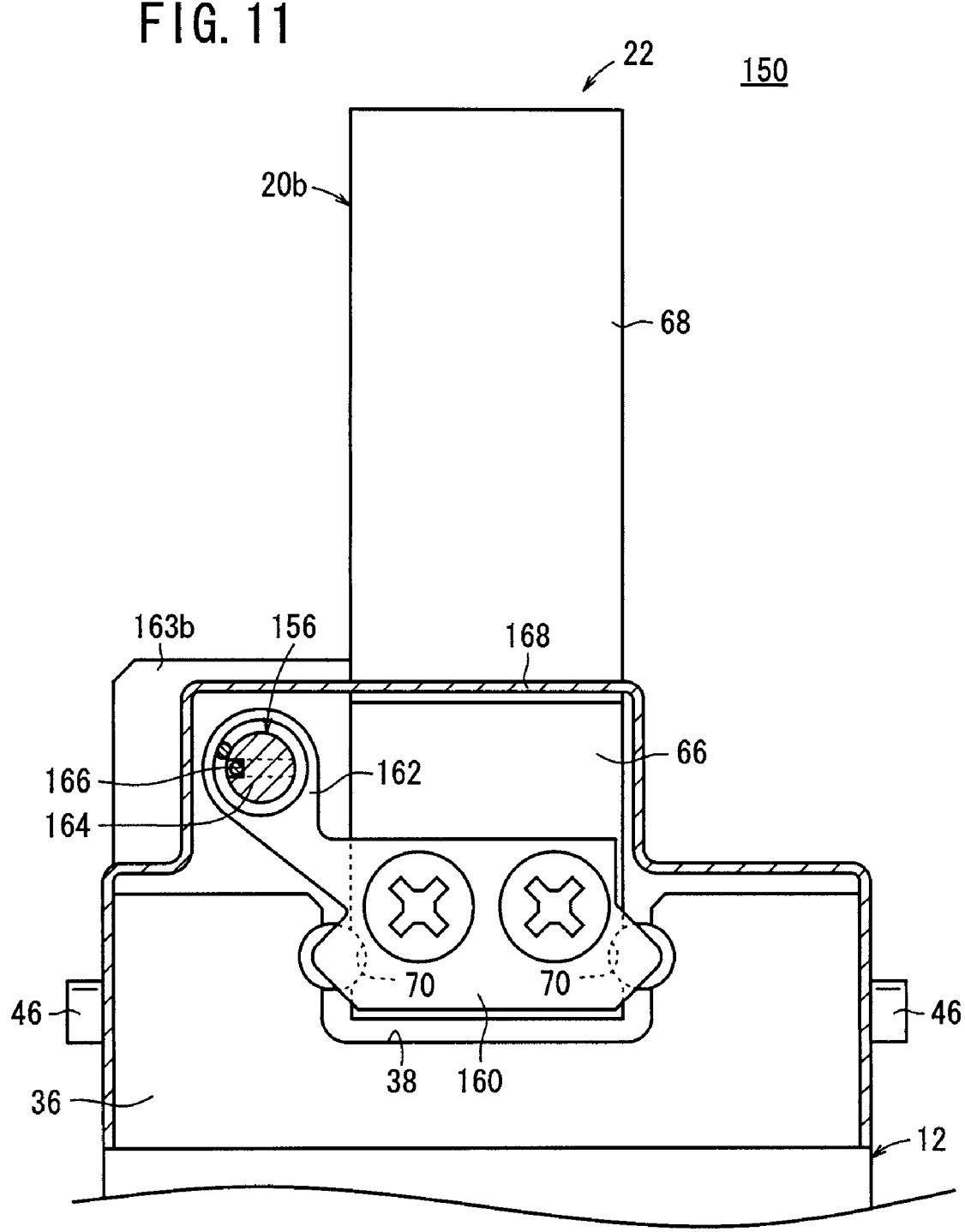
FIG. 11 is an enlarged side plan view showing the vicinity of the gripping member of the chuck apparatus shown in FIG. 9.

Next, a chuck apparatus 150 according to a fifth embodiment is shown in FIGS. 9 through 11.

The chuck apparatus 150 according to the fifth embodiment differs from the chuck apparatuses 10, 100, 120, 140 according to the first through fourth embodiments in that the detection mechanism (detector) 152 is disposed substantially parallel to and externally of the gripping member 22.

In the chuck apparatus 150, a pair of guide bodies 154a, 154b is disposed on an upper portion of the base body 36, substantially parallel with the gripping member 22, and large diameter portions 158a, 158b of the bobbin 156 are inserted through interiors of the guide bodies 154a, 154b. The guide bodies 154a, 154b are formed in cylindrical shapes, and are retained through cover plates 160, which are mounted on ends of the first and second fingers 20a, 20b.

In greater detail, bulging portions 162, which bulge outwardly toward sides of the guide bodies 154a, 154b, are disposed on the cover plates 160, whereby the guide bodies 154a, 154b are retained between the bulging portions 162 of the cover plates 160, which are mounted on both ends of the first and second fingers 20a, 20b. In this case, the bobbin 156 is inserted through the interior of the bulging portions 162.

Further, the large diameter portions 158a, 158b, which are formed on both ends of the bobbin 156, are accommodated in the guide bodies 154a, 154b that are arranged on sides of the end blocks 163a, 163b, and are retained in the second bobbin holes 76a, 76b of the end blocks 163a, 163b. Further, a coil 166 is wound around the small diameter portion 164, which is formed at a substantially central portion of the bobbin 156. The coil 166 is disposed between the pair of guide bodies 154a, 154b while being exposed to the exterior.

Furthermore, a cover 168 is mounted on an upper portion of the base body 36 so as to cover portions of the guide bodies 154a, 154b and the gripping member 22.

In addition, by causing a closing operation of the first and second fingers 20a, 20b, the guide bodies 154a, 154b are displaced mutually in directions to approach one another (the directions of the arrows A1) along with the first and second fingers 20a, 20b, such that the guide bodies 154a, 154b cover the coil 166. The displacement amount of the first and second fingers 20a, 20b is detected continuously based on the change in impedance of the coil 166, as the coil 166 is covered by the guide bodies 154a, 154b.

In the foregoing manner, with the fifth embodiment, because the detection mechanism 152 is disposed on the outside substantially parallel to the first and second fingers 20a, 20b, it is unnecessary for first and second bobbin holes 74a, 74b to be provided in the fingers 20a, 20b, and hence the first and second fingers 20a, 20b of a conventional chuck apparatus can be appropriated for use therewith. Owing thereto, the detection mechanism 152 can be easily and inexpensively disposed with respect to the chuck apparatus 150, and manufacturing costs can be reduced.

The chuck apparatus according to the first through fifth embodiments of the present invention is not limited by the aforementioned embodiments, and various other structures may be adopted as a matter of course, without deviating from the essential features and gist of the present invention.

Further, concerning the chuck apparatuses 10, 100, 120, 140, 150 according to the aforementioned first through fifth embodiments, an explanation has been given of an air-driven type, in which the gripping member 22 is opened and closed under the action of a supplied pressure fluid. However, the invention is not limited to such a feature and, for example, the above-described detection mechanism may also be provided in a electrically driven type of chuck apparatus, in which the opening/closing operation is accomplished by a rotary driving force of a rotary driving source, such as a motor or the like.

In this case as well, adverse effects of play or rattling of the transmitting mechanism, which transmits the rotary driving force to the gripping member 22, are not received, thereby enabling the opening/closing amount of the gripping member 22 to be detected highly accurately.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A chuck apparatus that grips a workpiece under an opening/closing action of a pair of chucks, comprising:
 a body;
 a gripping member having a pair of chucks, which are disposed so as to be openable and closable with respect to said body;
 a detector that detects an opening/closing amount of said gripping member, including a bobbin disposed substantially parallel to a displacement direction of said chucks and extending in an axial direction, and a coil which is wound around said bobbin;

a groove extending in the axial direction in said bobbin and through which said coil is inserted; and a hole disposed at the end of said groove, for regulating positioning of said coil, which is wound around said bobbin.

2. The chuck apparatus according to claim 1, wherein said detector is disposed inside of said gripping member.

3. The chuck apparatus according to claim 2, wherein said coil is arranged between said chucks and exposed externally when said pair of chucks are separated mutually from each other in an open state.

4. The chuck apparatus according to claim 2, wherein said coil is provided as a pair, said pair of coils being accommodated respectively inside of said chucks, in an open state in which said pair of chucks are separated mutually from each other.

5. The chuck apparatus according to claim 2, wherein said coil is provided as a pair, one of the coils being accommodated inside of said chuck, and the other of the coils being exposed outside of said chuck, in an open state in which said pair of chucks are separated mutually from each other.

6. The chuck apparatus according to claim 2, wherein said detector includes tubular bodies inserted through the interior of said chucks, said bobbin and said coil being arranged inside of said tubular bodies.

7. The chuck apparatus according to claim 6, wherein said tubular bodies are formed from a metal material of aluminum or brass.

8. The chuck apparatus according to claim 1, wherein a piston is disposed in said body, which is displaceable along an axial direction thereof under the supply of a pressure fluid, said chucks being opened and closed along with displacement of said piston.

9. The chuck apparatus according to claim 1, wherein said detector comprises guides disposed on an outer portion of said gripping member substantially in parallel with said gripping member, said bobbin being retained by said guides.

* * * * *